Figure 1:
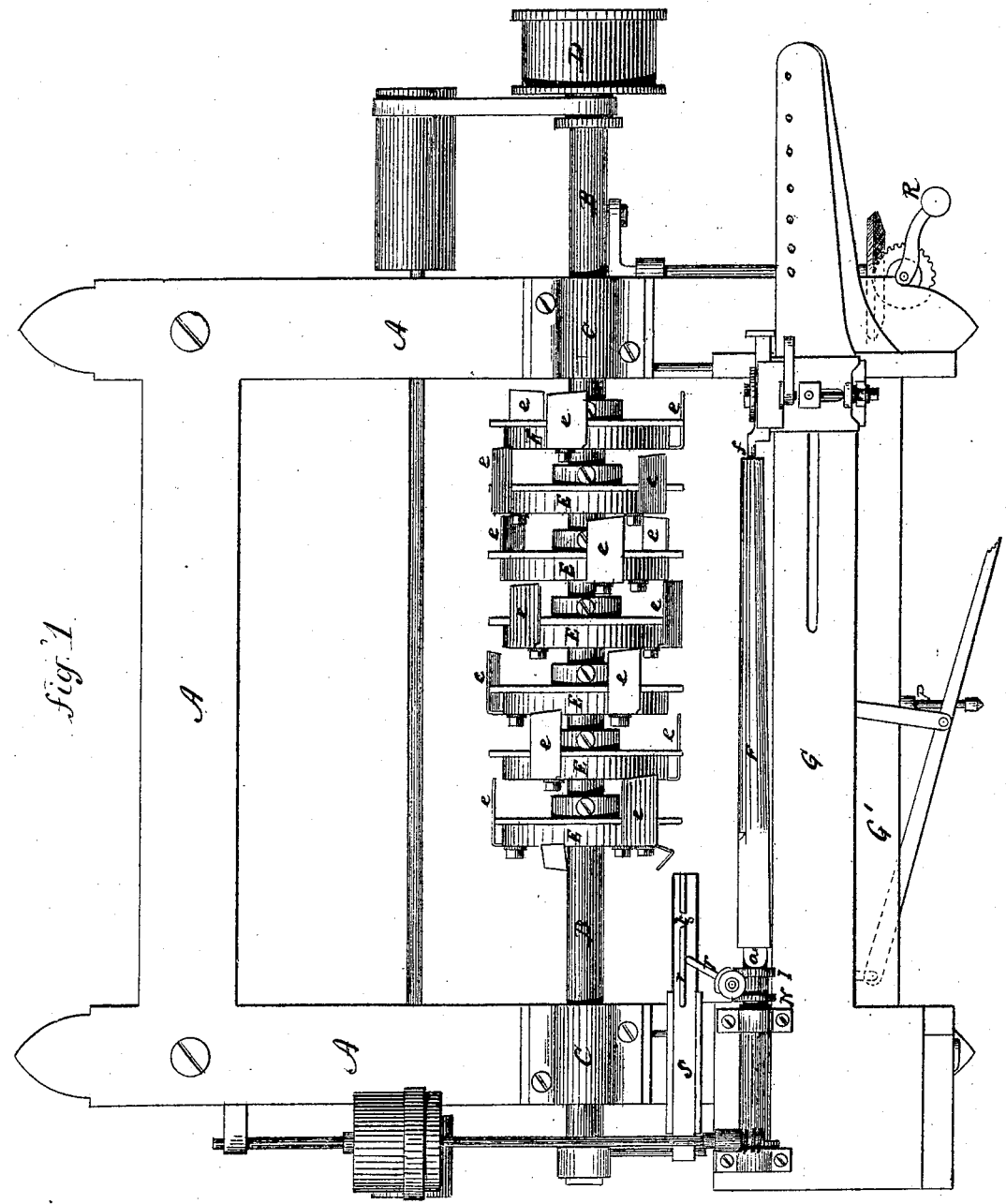

2 Sheets--Sheet 1.

L. WARD.

Improvement in Machines for Turning Spokes.

No. 132,702.  Patented Oct. 29, 1872.

2 Sheets--Sheet 2.
L. WARD.
Improvement in Machines for Turning Spokes.
No. 132,702. Patented Oct. 29, 1872.
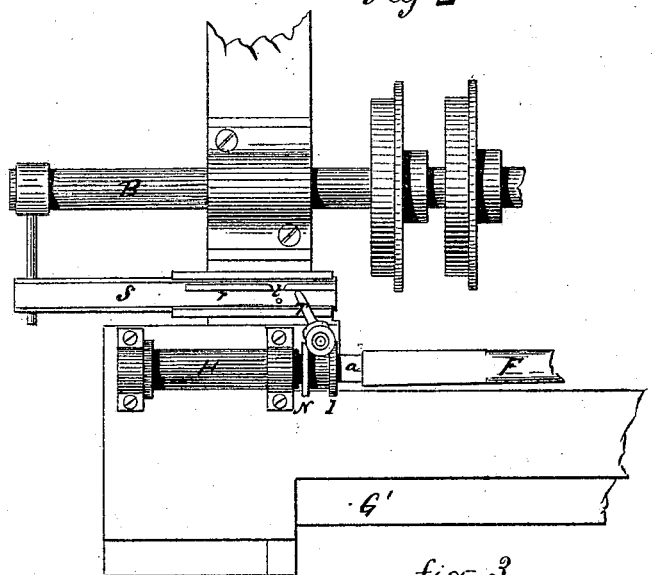
fig. 2
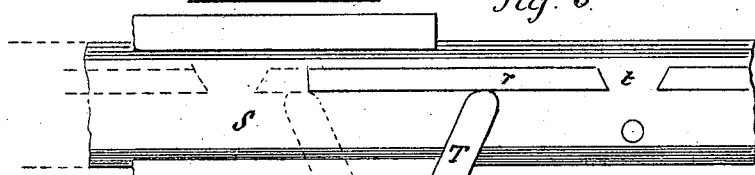
fig. 3
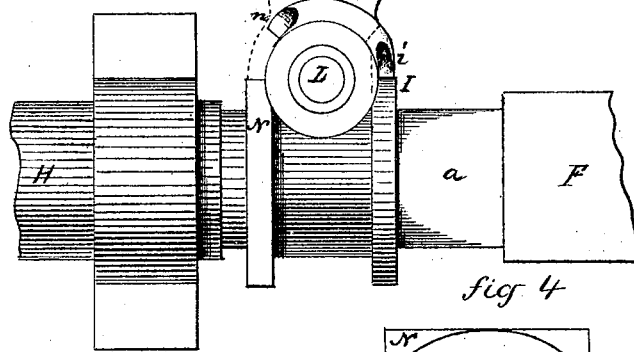
fig. 4
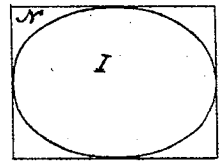
Witnesses
A. J. Tibbits
J. H. Shumway
Lewis Ward
Inventor
By Atty.

UNITED STATES PATENT OFFICE.

LEWIS WARD, OF NAUGATUCK, CONNECTICUT, ASSIGNOR TO HIMSELF AND WILLIAM B. LEWIS, OF SAME PLACE.

IMPROVEMENT IN MACHINES FOR TURNING SPOKES.

Specification forming part of Letters Patent No. 132,702, dated October 29, 1872.

*To all whom it may concern:*

Be it known that I, LEWIS WARD, of Naugatuck, in the county of New Haven and State of Connecticut, have invented a new Improvement in Machine for Turning Spokes; and I do hereby declare the following, when taken in connection with the accompanying drawing and the letters of reference marked thereon, to be a full, clear, and exact description of the same, and which said drawing constitutes part of this specification and represents, in—

Figure 1, a top view; Figs. 2 and 3, detached views, the latter enlarged; and in Fig. 4, diagrams of the cams.

This invention relates to an improvement in machines for turning spokes for carriage-wheels.

A is the frame of the machine; B, the driving-shaft, arranged in suitable bearings C, and caused to revolve by the application of power thereto through the pulley D. Upon this shaft the several cutter-heads E are arranged so as to revolve with the said shaft, and these heads armed with cutters e, the number of heads and cutters being sufficient to dress the entire length of the cylindrical portion of the spoke at once. The blank F is arranged upon the fixed center f and the revolving center a in substantially the usual manner, these centers being arranged upon a carriage, G, so as to be moved toward the cutters to carry the block for the spokes up to the cutters to be dressed. The revolution of the spoke is caused by a succession of belts and gearing in connection with the mandrel H, which carries the center or dog a. On this mandrel is a cam, I, which corresponds to the cylindrical form required for the spoke; and this cam, bearing against a fixed point when the spoke is at the required distance from the cutters, causes them to dress the spoke to the form indicated by said cam I in the usual manner. This is here represented as a projection, i, from a stud, L, on the part G' of the carriage, as seen in Fig. 3, the carriage being arrested when at the proper distance from the machine by means of an adjusting-screw, P. (See Fig. 1.) Thus far the machine is substantially that in common use, and dresses only that portion of the spoke above the square, the part G of the carriage sliding transversely on the part G' to allow the spoke to move to and from the cutters by the action of the cam I. In order to dress the square portion I arrange the driving-shaft B so as to move longitudinally from this position to the left, as seen in Fig. 2, and this is here done by turning a crank, R, which is in connection with the driving-shaft by suitable gearing, so that as the crank is turned in one direction the shaft and its cutter-heads will be driven to the left, and, returned, will draw the shaft and its cutter-heads back, the carriage G retained in its same longitudinal position. In connection with the driving-shaft is a slide, S, so as to move longitudinally with the shaft, and on this slide is a rib, r, in which is a notch, t; and from the stud L an arm, T, extends to the said rib r, as seen in Fig. 3, that position being the same as in Fig. 1 when the cutters are turning the cylindrical portion of the spoke. As the shaft, and with it the slide S, are thrown to the left the arm T is caught by the notch t and carried along to the left, as denoted in broken lines. This turns the stud so as to take the projection i from the cam I and to carry a similar projection, n, on the said stud, into contact with another cam, N, on the mandrel. This cam N is square, conforming to the square portion of the spoke, the diagram of the two cams I N being shown in their proper relative position in Fig. 4. The cam N then, bearing against the projection n and revolving, presents the blanks to the cutters so as to be turned square over that portion of the spoke required to be square.

I do not wish to be understood as broadly claiming a machine which will dress the spoke completely without removing the spoke from the machine.

I claim as my invention—

1. The shaft B, upon which are arranged the cutters, and provided with a mechanism for moving the said shaft longitudinally to a second position, combined with the transversely-moving carriage to hold the spoke, and the cams I N to govern the movement of the said carriage, substantially as and for the purpose specified.

2. In combination with the two cams I N, I claim the stud L provided with projections i n, and adjusted by the longitudinal movement of the shaft B so as to automatically present the said projections to their respective cams, substantially as set forth and described.

LEWIS WARD.

Witnesses:
L. S. SPENCER,
G. A. WADSWORTH.